(12) United States Patent
Kajiwara

(10) Patent No.: US 9,490,049 B2
(45) Date of Patent: Nov. 8, 2016

(54) WIRE HARNESS, METHOD FOR MANUFACTURING WIRE HARNESS, AND PROTECTIVE MEMBER

(71) Applicant: SUMITOMO WIRING SYSTEMS, LTD., Mie (JP)

(72) Inventor: Yasuhiro Kajiwara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/395,282

(22) PCT Filed: Dec. 28, 2012

(86) PCT No.: PCT/JP2012/084111
§ 371 (c)(1),
(2) Date: Oct. 17, 2014

(87) PCT Pub. No.: WO2013/161131
PCT Pub. Date: Oct. 31, 2013

(65) Prior Publication Data
US 2015/0068802 A1 Mar. 12, 2015

(30) Foreign Application Priority Data
Apr. 23, 2012 (JP) .................. 2012-097648

(51) Int. Cl.
*H01B 7/00* (2006.01)
*H02G 3/04* (2006.01)
*B60R 16/02* (2006.01)
*H01B 13/012* (2006.01)

(52) U.S. Cl.
CPC ......... *H01B 7/0045* (2013.01); *B60R 16/0215* (2013.01); *H01B 13/01236* (2013.01); *H01B 13/01281* (2013.01); *H02G 3/0487* (2013.01); *Y10T 428/24612* (2015.01)

(58) Field of Classification Search
CPC .................................................. H01B 7/0045
See application file for complete search history.

(56) References Cited

U.S. PATENT DOCUMENTS

| | | | |
|---|---|---|---|
| 2011/0275268 A1 | 11/2011 | Harris et al. | |
| 2012/0055605 A1* | 3/2012 | Murata | H01B 13/01254 156/51 |
| 2012/0309228 A1 | 12/2012 | Masuda et al. | |
| 2013/0000975 A1 | 1/2013 | Igarashi et al. | |
| 2013/0112473 A1* | 5/2013 | Toyama | B60R 16/0215 174/350 |

FOREIGN PATENT DOCUMENTS

| | | |
|---|---|---|
| JP | 62-122417 | 8/1987 |
| JP | 2011-233453 | 11/2011 |
| JP | 2011-244614 | 12/2011 |

OTHER PUBLICATIONS

Search report from PCT/JP2012/084111, mail date is Feb. 12, 2013.

* cited by examiner

*Primary Examiner* — Hoa C Nguyen
*Assistant Examiner* — Stanley Tso
(74) *Attorney, Agent, or Firm* — Greenblum & Bernstein, P.L.C.

(57) ABSTRACT

An object is to form a protective member such that its inner circumferential surface portion is hard and its outer circumferential surface portion is soft. A wire harness includes a wire harness main portion that includes at least one electrical wire, and a protective member. The protective member is formed by a laminate, which is obtained by overlaying an inner circumferential non-woven member and an outer circumferential non-woven member, being hot-pressed into a shape that covers at least a portion of the wire harness main portion, and the inner circumferential surface portion is harder than the outer circumferential surface portion.

2 Claims, 3 Drawing Sheets

WIRE HARNESS, METHOD FOR MANUFACTURING WIRE HARNESS, AND PROTECTIVE MEMBER

TECHNICAL FIELD

This invention relates to technology for maintaining a wire harness along a wiring path.

BACKGROUND ART

Conventionally, technology is known in which a wire harness is protected by a protective member obtained by hot-pressing non-woven cloth.

Patent Document 1 is an example of technology related to the present invention.

CITATION LIST

Patent Documents

Patent Document 1: JP 2011-244614A

SUMMARY OF INVENTION

Technical Problem

It is preferable to form the protective member so as to be as hard as possible in order for the protective member to exhibit a path restricting function. On the other hand, it is preferable to form the protective member so as to be as soft as possible in order to suppress the generation of noise due to the protective member coming into contact with surrounding members. Both of the above objectives can be achieved by forming the protective member such that its inner circumferential portion is hard and its outer circumferential portion is soft.

In view of this, an object of the present invention is to provide technology suited to forming a protective member such that its inner circumferential surface portion is hard and its outer circumferential surface portion is soft.

Solution to Problem

In order to solve the above problem, a wire harness according to a first aspect includes: a wire harness main portion that includes at least one electrical wire; and a protective member formed by a laminate being hot-pressed into a shape that covers at least a portion of the wire harness main portion, the laminate being obtained by overlaying an inner circumferential non-woven member and an outer circumferential non-woven member that have different properties, and an inner circumferential surface portion being harder than an outer circumferential surface portion, wherein the protective member is constituted by a combination of a pair of divided protective bodies that are formed as separate bodies and each have a recessed portion in which at least a portion of the wire harness main portion can be arranged, the divided protective bodies are each formed by the laminate obtained by overlaying the inner circumferential non-woven member and the outer circumferential non-woven member being sandwiched from two surface sides and hot-pressed, and two side portions of the pair of divided protective bodies are brought face-to-face and joined in surface contact with each other.

According to a second aspect, in the wire harness according to the first aspect, the inner circumferential non-woven member and the outer circumferential non-woven member are each constituted by a non-woven member that contains elementary fiber and a binder, and at least one of the ratio of the binder and the melting point of the binder is different between the inner circumferential non-woven member and the outer circumferential non-woven member.

A wire harness manufacturing method according to a sixth aspect includes: (a) a step of overlaying a plurality of non-woven members that have different properties; (b) a step of manufacturing a pair of divided protective bodies as separate bodies, each having a recessed portion in which at least a portion of a wire harness main portion can be arranged, by sandwiching a laminate obtained by overlaying the plurality of non-woven members from two surface sides and performing hot-pressing; and (c) step of storing at least a portion of the wire harness main portion inside the pair of divided protective bodies, and uniting the plurality of divided protective bodies by bringing face-to-face and joining two side portions of the pair of divided protective bodies in surface contact with each other.

A protective member according to a seventh aspect is formed by a laminate being hot-pressed into a shape that covers at least a portion of a wire harness main portion, the laminate being obtained by overlaying an inner circumferential non-woven member and an outer circumferential non-woven member that have different properties, and an inner circumferential surface portion being harder than an outer circumferential surface portion, wherein the protective member is constituted by a combination of a pair of divided protective bodies that are formed as separate bodies and each have a recessed portion in which at least a portion of the wire harness main portion can be arranged, the divided protective bodies are each formed by the laminate obtained by overlaying the inner circumferential non-woven member and the outer circumferential non-woven member being sandwiched from two surface sides and hot-pressed, and the pair of divided protective bodies are formed such that two side portions thereof can be brought face-to-face and joined in surface contact with each other.

Advantageous Effects of Invention

According to the first, sixth, and seventh aspects, the protective member is formed by the non-woven cloth laminate, which is obtained by overlaying the inner circumferential non-woven member and the outer circumferential non-woven member, being hot-pressed into a shape that covers at least a portion of the wire harness main portion, and thus the protective member can be easily formed such that its inner circumferential surface portion is hard and its outer circumferential surface portion is soft.

According to the second aspect, at least one of the ratio of the binder and the melting point of the binder is different between the inner circumferential non-woven member and the outer circumferential non-woven member, and thus the protective member can be easily formed such that its inner circumferential surface portion is hard and its outer circumferential surface portion is soft.

According to the first, sixth, and seventh aspects, the divided protective bodies are each formed by the laminate, which is obtained by overlaying the inner circumferential non-woven member and the outer circumferential non-woven member, being sandwiched from the two surface sides and hot-pressed, thus making it possible to apply sufficient heat and pressure to the portion that forms the inner circumferential surface portion of the protective member so as to perform processing for becoming harder.

According to the first, sixth, and seventh aspects, the divided protective bodies are each formed as a separate body, thus facilitating the processing thereof.

DESCRIPTION OF EMBODIMENTS

The following describes a wire harness, a wire harness manufacturing method, and a protective member according to an embodiment.

Figure 1:
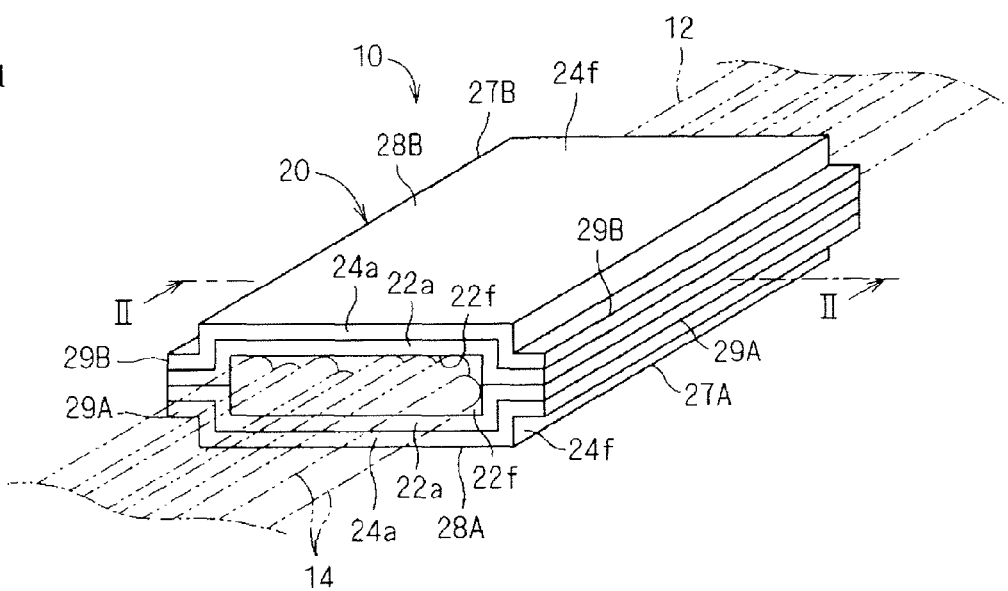
FIG. 1 is a perspective view of a wire harness according to an embodiment.
Figure 2:
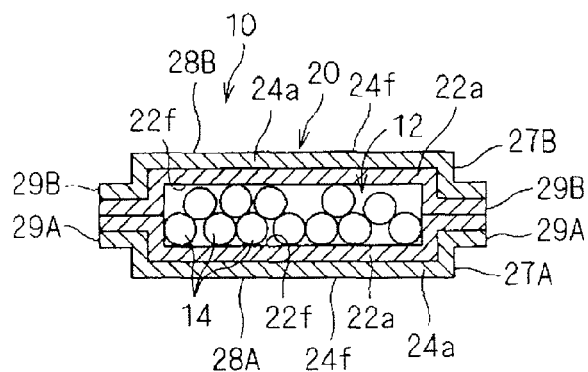
FIG. 2 is a cross-sectional view taken along a line II-II in FIG. 1.

FIG. 1 is a perspective view of a wire harness 10, and FIG. 2 is a cross-sectional view taken along a line II-II in FIG. 1.

The wire harness 10 includes a wire harness main portion 12 and a protective member 20.

The wire harness main portion 12 includes at least one electrical wire 14. Here, the wire harness main portion 12 includes a bundled portion of multiple electrical wires 14, and this portion is protected by the protective member 20. The wire harness main portion 12 may be branched at an intermediate point. Optical fiber cables or the like may be included in the wire harness main portion 12. The entirety of the wire harness main portion may be protected by the protective member.

The wire harness main portion 12 is arranged along a predetermined wiring topology in a vehicle, and is connected to various types of in-vehicle electrical parts via connector connections or the like. The in-vehicle electrical parts are thus electrically connected to each other via the wire harness main portion 12.

The protective member 20 is formed by a laminate 26 (described later), which is obtained by overlaying an inner circumferential non-woven member 22 and an outer circumferential non-woven member 24, being hot-pressed into a shape that covers at least a portion of the wire harness main portion 12. Also, finishing is performed such that an inner circumferential surface portion 22f of an inner circumferential non-woven member 22a resulting from the hot-pressing processing is harder than an outer circumferential surface portion 24f of an outer circumferential non-woven member 24a likewise resulting from the hot-pressing processing.

Here, hot-pressing refers to performing heating processing on a non-woven member and then performing processing for pressing the non-woven member into a mold for formation into a predetermined shape. The heating processing and the processing for formation into a predetermined shape may be performed at the same time, or may be performed separately and successively. For example, by heating a non-woven member in a compressed state and then bending it by pressing it into a predetermined mold before it hardens due to cooling, it is possible to maintain the bent shape. An example of hot-pressing processing suited to the processing of the protective member 20 of this embodiment will be described in detail later.

Also, a member that can at least partially melt or soften, and then harden through a cooling process can be used as the non-woven member to be processed. A member that contains elementary fibers and a binder (also called an adhesive resin) can be used as the non-woven member. The binder is a resin that has a lower melting point than the melting point of the elementary fiber. The non-woven member is then heated to a temperature that is lower than the melting point of the elementary fibers and higher than the melting point of the binder such that the binder melts and soaks in between the elementary fibers. The binder then solidifies as the temperature of the non-woven member decreases. The non-woven member can thus be maintained in a molded state during heating. Additionally, the solidified binder can also join together portions of non-woven members that are in contact with each other.

The elementary fibers of the non-woven member need only be able to maintain a fibrous state at the melting point of the binder, and various types of fibers other than resin fibers, such as glass fibers, can be used. Also, thermoplastic resin fibers that have a lower melting point than the melting point of the elementary fibers can be used as the binder. For example, in one example of a combination of elementary fibers and a binder, the elementary fibers are PET (polyethylene terephthalate) resin fibers, and the binder is a copolymer resin of PET and PEI (polyethylene isophthalate).

In order to perform processing such that the inner circumferential surface portion 22f of the protective member 20 is hard and the outer circumferential surface portion 24f of the protective member 20 is soft after performing the hot-pressing as described above, members having different properties may be used as the inner circumferential non-woven member 22 and the outer circumferential non-woven member 24. Specifically, a member that more easily hardens than the outer circumferential non-woven member 24 when subjected to hot-pressing under the same conditions may be used as the inner circumferential non-woven member 22.

For example, the ratio of the binder in the inner circumferential non-woven member 22 may be set higher than the ratio of the binder in the outer circumferential non-woven member 24. In this case, when the inner circumferential non-woven member 22 and the outer circumferential non-woven member 24 are heated under the same conditions (temperature, time, etc.), a greater amount of the binder in the inner circumferential non-woven member 22 will melt and join the elementary fibers more firmly. For this reason, when the inner circumferential non-woven member 22 and the outer circumferential non-woven member 24 are heated to the same temperature, the inner circumferential non-woven member 22 hardens to a greater extent.

In the case where the inner circumferential non-woven member 22 and the outer circumferential non-woven member 24 include elementary fibers and binder fibers obtained by covering the same fibers as the elementary fibers with an adhesive resin, it is preferable to use members according to which the weight ratio of binder fibers to the total weight of elementary fibers and binder fibers is 80 to 100 in the inner circumferential non-woven member 22, and is 20 to 40 in the outer circumferential non-woven member 24.

Also, materials that have different melting points may be used as the binder in the inner circumferential non-woven member 22 and the binder in the outer circumferential non-woven member 24. Specifically, a material that has a lower melting point than the melting point of the binder in the outer circumferential non-woven member 24 may be used as the binder in the inner circumferential non-woven member 22. In this case, different resin materials or resins having different degrees of polymerization may be used as the binder in the inner circumferential non-woven member 22 and the binder in the outer circumferential non-woven member 24.

Also, both the ratio and the melting point of the binder may be different between the inner circumferential non-woven member 22 and the outer circumferential non-woven member 24.

Additionally, the bulk density or the like may be different between the inner circumferential non-woven member 22 and the outer circumferential non-woven member 24.

Here, regarding the shape that covers at least a portion of the wire harness main portion 12, the protective member 20 is shaped as a tube, or more specifically a flattened rectangular tube. Here, the protective member 20 extends in the shape of a straight line, but it may curve at an intermediate point or branch at an intermediate point.

Also, the protective member 20 is constituted by a combination of multiple divided protective bodies 27A and 27B. More specifically, the protective member 20 includes a pair of divided protective bodies 27A and 27B obtained by dividing the protective member 20 at the short-side portions of the flattened rectangular tube. Also, the pair of divided protective bodies 27A and 27B are not connected by a hinge or the like, and are formed as separate bodies as will be described below.

The pair of divided protective bodies 27A and 27B include storage body portions 28A and 28B and edge portions 29A and 29B.

The storage body portions 28A and 28B are shaped as tube halves that correspond to the wiring path of the protection target portion of the wire harness main portion 12, and here, are shaped as rectangular tube halves, or more specifically flattened rectangular tube halves. Shallow storage recessed portions are formed in the storage body portions 28A and 28B, and these storage recessed portions are open toward the two end portions of the storage body portions 28A and 28B and toward the side between the two end portions.

The edge portions 29A and 29B are formed so as to protrude outward on the two side portions of the storage body portions 28A and 28B. The edge portions 29A and 29B are shaped as thin elongated plates that extend along the direction that connects the two side edge portions of the storage body portions 28A and 28B.

Also, the divided protective bodies 27A and 27B are each formed by the laminate 26, which is obtained by overlaying the inner circumferential non-woven member 22 and the outer circumferential non-woven member 24, being hot-pressed in the state of being sandwiched from the two surface sides, namely the inner circumferential surface side and outer circumferential surface side of the protective member 20. In other words, the two surfaces of the divided protective bodies 27A and 27B exhibit a property of being processed by the surface of a mold for hot-pressing.

Then, the protection target portion of the wire harness main portion 12 is stored between the pair of divided protective bodies 27A and 27B and the two side portions of the divided protective bodies 27A and 27B are brought face-to-face with each other, and thus the edge portions 29A and 29B are brought face-to-face and joined in surface contact with each other. This constitutes the protective member 20 that protects at least a portion of the wire harness main portion 12. The joining of the edge portions 29A and 29B together can be performed using double-side tape, ultrasonic bonding, thermal welding, stapling, or the like.

Note that it is not necessarily required here that the pair of divided protective bodies 27A and 27B are shaped so as to be plane-symmetric via the joined surfaces thereof. For example, one of the two divided protective bodies may be formed with a shape that is deeper than the other one. Of course, it is preferable that the two side edge portions of the pair of divided protective bodies oppose each other at as many locations as possible.

Also, the protective member 20 may be constituted by a combination of three divided protective bodies.

The following describes an example of a method for manufacturing the wire harness 10.

Figure 3:
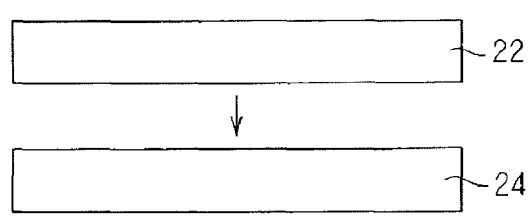
FIG. 3 is an illustrative diagram of wire harness manufacturing processes.

First, as shown in FIG. 3, the inner circumferential non-woven member 22 and the outer circumferential non-woven member 24 are overlaid on each other. Another non-woven member may be interposed between the inner circumferential non-woven member 22 and the outer circumferential non-woven member 24. Also, although the inner circumferential non-woven member 22 and the outer circumferential non-woven member 24 have the same size and shape and are continuous over the entirety of each other here, the inner circumferential non-woven member 22 or the outer circumferential non-woven member 24 may have partial omissions relative to the other one.

Figure 4:
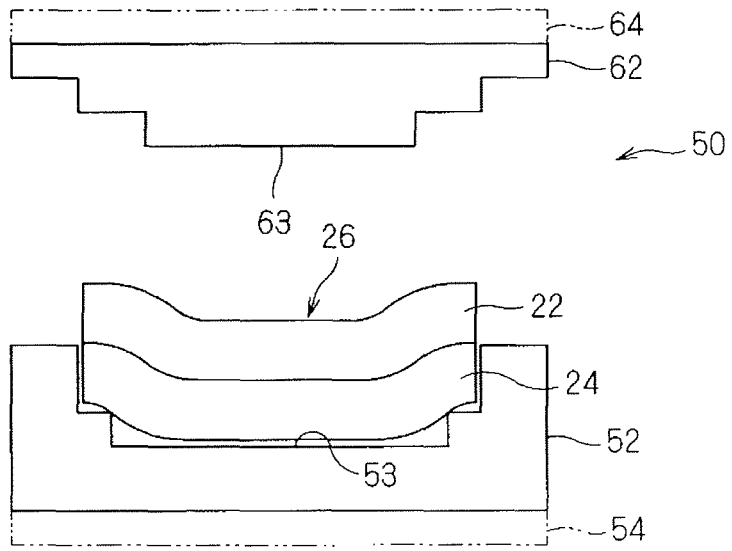
FIG. 4 is an illustrative diagram of wire harness manufacturing processes.
Figure 5:
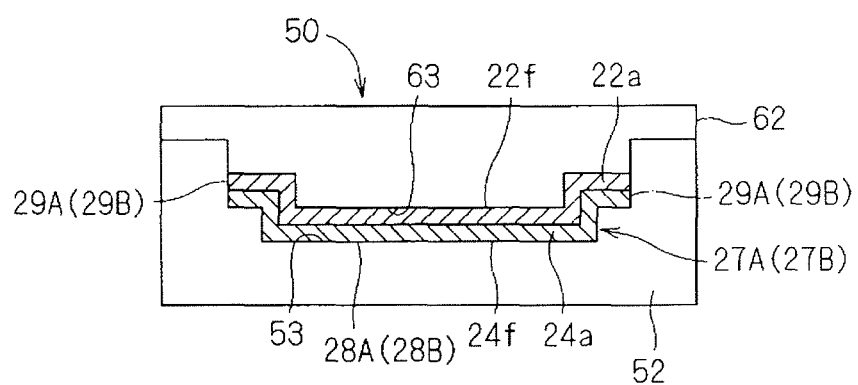
FIG. 5 is an illustrative diagram of wire harness manufacturing processes.

Next, as shown in FIGS. 4 and 5, the laminate 26 constituted by the inner circumferential non-woven member 22 and the outer circumferential non-woven member 24 is hot-pressed using a hot-pressing mold 50.

The hot-pressing mold 50 includes a lower mold 52 and an upper mold 62.

The lower mold 52 is an elongated member formed by a metal having excellent thermal conductivity for example, and a lower mold surface 53 is formed on one principal surface (the upper surface) thereof. The lower mold surface 53 is the portion that forms the outer circumferential surface of the divided protective bodies 27A and 27B, and is shaped as a groove that is deep at the center in the width direction and becomes shallow on the two sides in the width direction via a step portion. The dimension of the lower mold surface 53 in the long-side direction is set so as to be the same as or roughly longer than the length dimension of the portion of the wire harness main portion 12 that is to be the protection target portion. The lower mold surface 53 is shaped so as to extend along the path of the protection target portion of the wire harness main portion 12 when this portion is disposed in the vehicle body.

The upper mold 62 is an elongated member formed by a metal having excellent thermal conductivity for example, and an upper mold surface 63 is formed on one principal surface (the lower surface) thereof. The upper mold surface 63 is formed in the shape of a thin elongated projection, and is shaped so as to be tall at the center in the width direction and become short in the two side portions in the width direction via a step portion. The width of the upper mold surface 63 is set large enough to be able to be arranged within the lower mold surface 53 while blocking the upper opening of the lower mold surface 53. Also, the upper mold surface 63 is shaped so as to extend along the shape of the lower mold surface 53.

By then arranging the upper mold surface 63 within the lower mold surface 53, a space capable of forming the divided protective bodies 27A and 27B is formed therebetween. Note that the lower mold 52 and the upper mold 62 are provided with heating portions 54 and 64 that are heaters or the like.

The following describes a method for performing hot-pressing processing using the hot-pressing mold 50.

First, the laminate 26 constituted by the sheet-like inner circumferential non-woven member 22 and the sheet-like outer circumferential non-woven member 24 is arranged within the lower mold surface 53. Note that the task of overlaying the inner circumferential non-woven member 22 and the outer circumferential non-woven member 24 may be performed on the lower mold surface 53.

Thereafter, the upper mold surface 63 of the upper mold 62 is arranged within the lower mold surface 53, and the laminate 26 is sandwiched from the two surface sides by the lower mold surface 53 and the upper mold surface 63. Heating is then performed centered about the portion of the laminate 26 that is in contact with the lower mold 52 and the upper mold 62. Note that the heating temperature of the lower mold 52 and the heating temperature of the upper mold 62 do not need to be the same. The heating temperature of the lower mold 52 may be set higher than the heating temperature of the upper mold 62 in order to effectively harden the inner circumferential surface portions 22$f$ of the divided protective bodies 27A and 27B.

Thereafter, as the laminate 26 is cooled, between the lower mold 52 and the upper mold 62, the inner circumferential surface portion 22$f$ of the inner circumferential non-woven member 22$a$ hardens into a shape that corresponds to the shape of the lower mold surface 53, and the outer circumferential surface portion 24$f$ of the outer circumferential non-woven member 24 hardens into a shape that corresponds to the shape of the upper mold surface 63. Also, the inner circumferential non-woven member 22$a$ and the outer circumferential non-woven member 24$a$ are joined to each other in an overlaid state by the binder resin in them. The divided protective bodies 27A and 27B are thus formed.

Thereafter, the divided protective bodies 27A and 27B are removed from the hot-pressing mold 50. The pair of divided protective bodies 27A and 27B may be formed by the same hot-pressing mold 50, or may be formed by separate hot-pressing molds.

Figure 6:
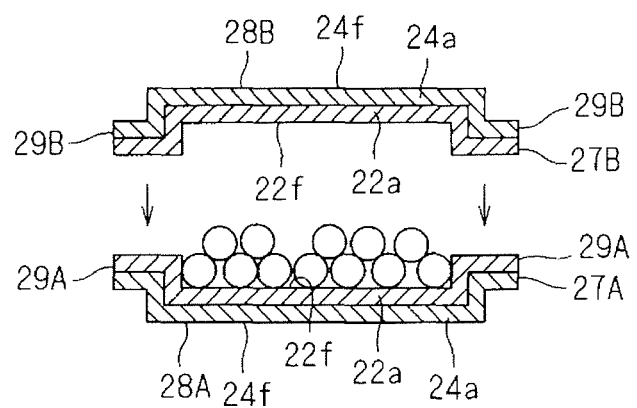
FIG. 6 is an illustrative diagram of wire harness manufacturing processes.

Then, as shown in FIG. 6, the pair of divided protective bodies 27A and 27B formed as described above are prepared, and the pair of divided protective bodies 27A and 27B are united such that at least a portion of the wire harness main portion 12 is stored inside the divided protective bodies 27A and 27B.

The unification of the two bodies can be performed by for example, using double-side tape to adhere together the edge portions 29A and 29B that are arranged face-to-face as described above.

According to the wire harness 10, the manufacturing method for the wire harness 10, and the protective member 20 configured as described above, the protective member 20 is formed by the laminate 26, which is obtained by overlaying the inner circumferential non-woven member 22 and the outer circumferential non-woven member 24, being hot-pressed into a shape that covers at least a portion of the wire harness main portion 12, and therefore by using materials having different properties as the inner circumferential non-woven member 22 and the outer circumferential non-woven member 24 for example, it is easy to form the inner circumferential surface portion 22$f$ of the protective member 20 so as to be hard and form the outer circumferential surface portion 24$f$ of the protective member 20 so as to be soft.

More specifically, by causing at least one of the ratio of the binder and the melting point of the binder to be different between the inner circumferential non-woven member 22 and the outer circumferential non-woven member 24, it is possible to easily obtain different hardnesses after processing even under the same hot-pressing conditions.

Also, with the inner circumferential surface portion 22$f$ formed so as to be relatively hard, it is possible to achieve sufficient wear resistance and a sufficient function of restricting the path of the wire harness main portion 12. Also, with the outer circumferential surface portion 24$f$ formed so as to be relatively soft, it is possible to achieve a function of suppressing contact noise when the wire harness 10 comes into contact with surrounding members in the vehicle. Accordingly, the protective member 20 having the path restricting function, wear resistance, and the contact noise suppressing function can be realized with a configuration that is light-weight and has a low number of parts.

Also, since the protective member 20 is divided into the pair of divided protective bodies 27A and 27B, the laminate 26 obtained by overlaying the non-woven members 22 and 24 can be hot-pressed while being sandwiched from the two surface sides. This makes it possible to apply sufficient heat and pressure to the inner circumferential surface portion 22$f$ of the protective member 20 so as to perform processing for becoming sufficiently hard, thus making it possible to improve the path restricting function and wear resistance.

Of course, it is not essential that the protective member 20 has a structure of being divided into the pair of divided protective bodies 27A and 27B, and that the laminate 26 is hot-pressed while being sandwiched from the two surface sides.

For example, a laminate constituted by multiple non-woven members may be rolled into a tube and then heated and pressed from the inner and outer circumferential sides. Also, for example, a configuration is possible in which a laminate constituted by multiple non-woven members is wound around at least a portion of the wire harness main portion 12, and then the laminate is heated from the outer circumferential side. In the latter case as well, if the amount of binder contained in the non-woven member on the inner circumferential side is set so as to be sufficiently large, the melting point of the binder contained in the non-woven member on the inner circumferential side is set so as to be sufficiently low, or the like, such that a sufficient amount of the binder contained in the non-woven member on the inner circumferential side melts due to heat from the outer circumferential side of the laminate, then the inner circumferential surface portion of the protective member 20 can be made harder than the outer circumferential surface portion.

Also, since the pair of divided protective bodies 27A and 27B are formed as separate bodies, the respective processing thereof is easy. In particular, if the protective member 20 has a complex curved shape, it is effective to form the pair of divided protective bodies 27A and 27B as separate bodies.

Figure 7:
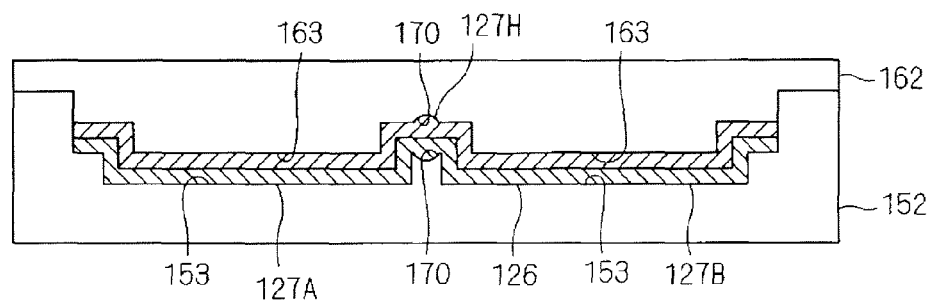
FIG. 7 is an illustrative diagram of a wire harness according to a variation.
Figure 8:
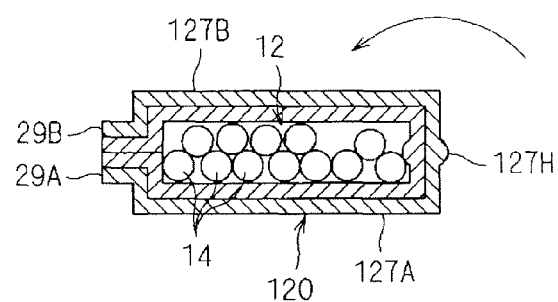
FIG. 8 is an illustrative diagram of the wire harness according to the variation.

Of course, as shown in FIGS. 7 and 8, a protective member 120 that corresponds to the protective member 20 may include multiple (here, a pair of) divided protective bodies 127A and 127B, and the divided protective bodies 27A and 27B may be connected by a hinge portion 127H so as to be openable and closable.

Here, the side portions on one side of the pair of divided protective bodies 127A and 127B are not provided with the edge portions 29A and 29B, and instead these side portions of the pair of divided protective bodies 127A and 127B are connected to each other by the hinge portion 127H.

It is preferable that the hinge portion 127H is formed so as to be softer than the other portions of the pair of divided protective bodies 127A and 127B. For example, the hinge portion 127H can be formed so as to be softer by, for example, lowering the degree of compression or lowering the heating temperature compared to the other portions.

The above-described pair of divided protective bodies 127A and 127B can be manufactured by hot-pressing a laminate 126 between a lower mold 152, which is constituted such that two portions 153 corresponding to the lower mold surface 53 are formed side-by-side, and an upper mold 162, which is constituted such that two portions 163 corresponding to the upper mold surface 63 are formed side-by-side. In this case, the hinge portion 127H may be formed by forming recessed portions 170 for lowering the degree of compression of the laminate 126 in a portion between the portions 153 of the lower mold 152 and a portion between the portions 163 of the upper mold 162 (i.e., portions that form the portions for connecting the pair of divided protective bodies 127A and 127B).

Then, at least a portion of the wire harness main portion 12 is arranged inside the one divided protective body 127A, the bodies are closed with the hinge portion 127H serving as the base point such that the other divided protective body 127B covers the region above the one divided protective body 127A, and then the edge portions 29A and 29B are joined together on the side opposite to the hinge portion 127H, and thus the protective member 120 is constituted.

Effects similar to the above embodiment can be obtained with this variation as well, with the exception of the advantage obtained by making one of the divided protective bodies a separate body.

Also, since the pair of divided protective bodies 127A and 127B are connected via the hinge portion 127H, the number of parts can be reduced, thus facilitating the management and manufacturing thereof.

Although the invention has been described in detail above, the foregoing description is illustrative in all aspects, and the invention is not limited thereto. It will be appreciated that countless variations not illustrated herein can be conceived without departing from the scope of the invention.

REFERENCE SIGNS LIST

10 Wire harness
12 Wire harness main portion
14 Electrical wire
20, 120 Protective member
22, 22a Inner circumferential non-woven member
22f Inner circumferential surface portion
24, 24a Outer circumferential non-woven member
24f Outer circumferential surface portion
26, 126 Laminate
27A, 27B Divided protective body
127A, 127B Divided protective body
127H Hinge portion

The invention claimed is:

1. A wire harness comprising:
a wire harness main portion that includes at least one electrical wire; and
a protective member comprising a hot-pressed laminate having a shape that covers at least a portion of the wire harness main portion, the laminate comprising an overlaid inner circumferential non-woven member and outer circumferential non-woven member that have different properties, and an inner circumferential surface portion being harder than an outer circumferential surface portion,
wherein the protective member includes a pair of divided protective bodies, each divided protective body comprising a recessed portion in which at least a portion of the wire harness main portion can be arranged,
the divided protective bodies each comprising the hot-pressed laminate, the laminate comprising the overlaid inner circumferential non-woven member and the outer circumferential non-woven member,
two side portions of the pair of divided protective bodies are face-to-face and joined in surface contact with each other,
wherein the inner circumferential non-woven member and the outer circumferential non-woven member are each constituted by a non-woven member that contains elementary fiber and a binder, and
at least one of the ratio of the binder and the melting point of the binder is different between the inner circumferential non-woven member and the outer circumferential non-woven member, and
a hinge between the divided protective bodies connecting the divided protective bodies to each other,
wherein the hinge is softer than the inner circumferential surface portion and the outer circumferential surface portion.

2. A protective member comprising a hot-pressed laminate having a shape that covers at least a portion of a wire harness main portion, the laminate comprising an overlaid inner circumferential non-woven member and outer circumferential non-woven member that have different properties, and an inner circumferential surface portion being harder than an outer circumferential surface portion,
wherein the protective member includes a combination of a pair of divided protective bodies, each divided protective body comprising a recessed portion in which at least a portion of the wire harness main portion can be arranged,
the divided protective bodies each comprising the hot-pressed laminate, the laminate comprising the overlaid inner circumferential non-woven member and the outer circumferential non-woven member,
the pair of divided protective bodies comprising two side portions thereof that are face-to-face and joined in surface contact with each other,
wherein the inner circumferential non-woven member and the outer circumferential non-woven member are each constituted by a non-woven member that contains elementary fiber and a binder, and
at least one of the ratio of the binder and the melting point of the binder is different between the inner circumferential non-woven member and the outer circumferential non-woven member, and
a hinge between the divided protective bodies connecting the divided protective bodies to each other,
wherein the hinge is softer than the inner circumferential surface portion and the outer circumferential surface portion.

* * * * *